US011188959B2

(12) United States Patent
Goyal et al.

(10) Patent No.: US 11,188,959 B2
(45) Date of Patent: Nov. 30, 2021

(54) POINT OF PURCHASE BASED PHYSICAL ITEM OFFER OPTIMIZATION

(71) Applicant: International Business Machines Corporation, Armonk, NY (US)

(72) Inventors: Munish Goyal, Yorktown Heights, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 16/551,279

(22) Filed: Aug. 26, 2019

(65) Prior Publication Data

US 2021/0065265 A1 Mar. 4, 2021

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0601* (2013.01); *G06Q 50/01* (2013.01)

(58) Field of Classification Search
CPC ........................... G06Q 30/0601; G06Q 50/01
See application file for complete search history.

(56) References Cited

U.S. PATENT DOCUMENTS

2003/0149618 A1 8/2003 Sender et al.
2006/0224439 A1* 10/2006 Smith ................. G06Q 10/087 705/7.35
2008/0140511 A1* 6/2008 Sharma ............. G06Q 30/0202 705/7.31
2010/0017283 A1 1/2010 Hamilton, II et al.
2011/0313840 A1* 12/2011 Mason .................... H04W 4/02 705/14.35
2014/0358696 A1 12/2014 Ben-Dor et al.
(Continued)

FOREIGN PATENT DOCUMENTS

WO 2016011178 A1 1/2016

OTHER PUBLICATIONS

Hartline, Jason, Vahab Mirrokni, and Mukund Sundararajan. "Optimal marketing strategies over social networks." Proceedings of the 17th international conference on World Wide Web. 2008.*

*Primary Examiner* — Kathleen Palavecino
(74) *Attorney, Agent, or Firm* — Garg Law Firm, PLLC; Rakesh Garg; Michael O'Keefe

(57) ABSTRACT

An offer specifying a physical product, a physical location, a time limit, and an upper limit of instances of the physical product is configured. An optimal item exhaustion rate corresponding to the offer is determined. An expected conversion rate corresponding to the offer and an expected customer travel time corresponding to the offer are forecasted for a registered customer. The registered customer is computed as a prospective customer. Using the optimal item exhaustion rate and the expected customer travel time, an offer time corresponding to the prospective customer and the offer is selected to allow the prospective customer to arrive at the physical location at a time consistent with the optimal exhaustion rate, the time being before the time limit and before a number of sold instances of the physical product exceeds the upper limit. The offer is transmitted at the offer time.

20 Claims, 8 Drawing Sheets

100
APPLICATION 105
SERVER 104
CLIENT 114
STORAGE 108
NETWORK 102
CLIENT 110
GPS 134
CLIENT 112
DEVICE 132
SERVER 106

(56) References Cited

U.S. PATENT DOCUMENTS

| | | | | |
|---|---|---|---|---|
| 2015/0012384 | A1* | 1/2015 | Bank | G06Q 30/0613<br>705/26.41 |
| 2015/0112790 | A1 | 4/2015 | Wolinsky et al. | |
| 2016/0012488 | A1 | 1/2016 | Deshpande et al. | |
| 2017/0178221 | A1* | 6/2017 | Mccorry | G06Q 50/01 |
| 2018/0182013 | A1* | 6/2018 | Haubold | G06Q 30/0641 |
| 2019/0080285 | A1 | 3/2019 | Natarajan et al. | |
| 2019/0378155 | A1* | 12/2019 | Wong | H04W 4/23 |

* cited by examiner

100
APPLICATION 105
SERVER 104
CLIENT 114
STORAGE 108
NETWORK 102
CLIENT 110
CLIENT 112
GPS 134
DEVICE 132
SERVER 106

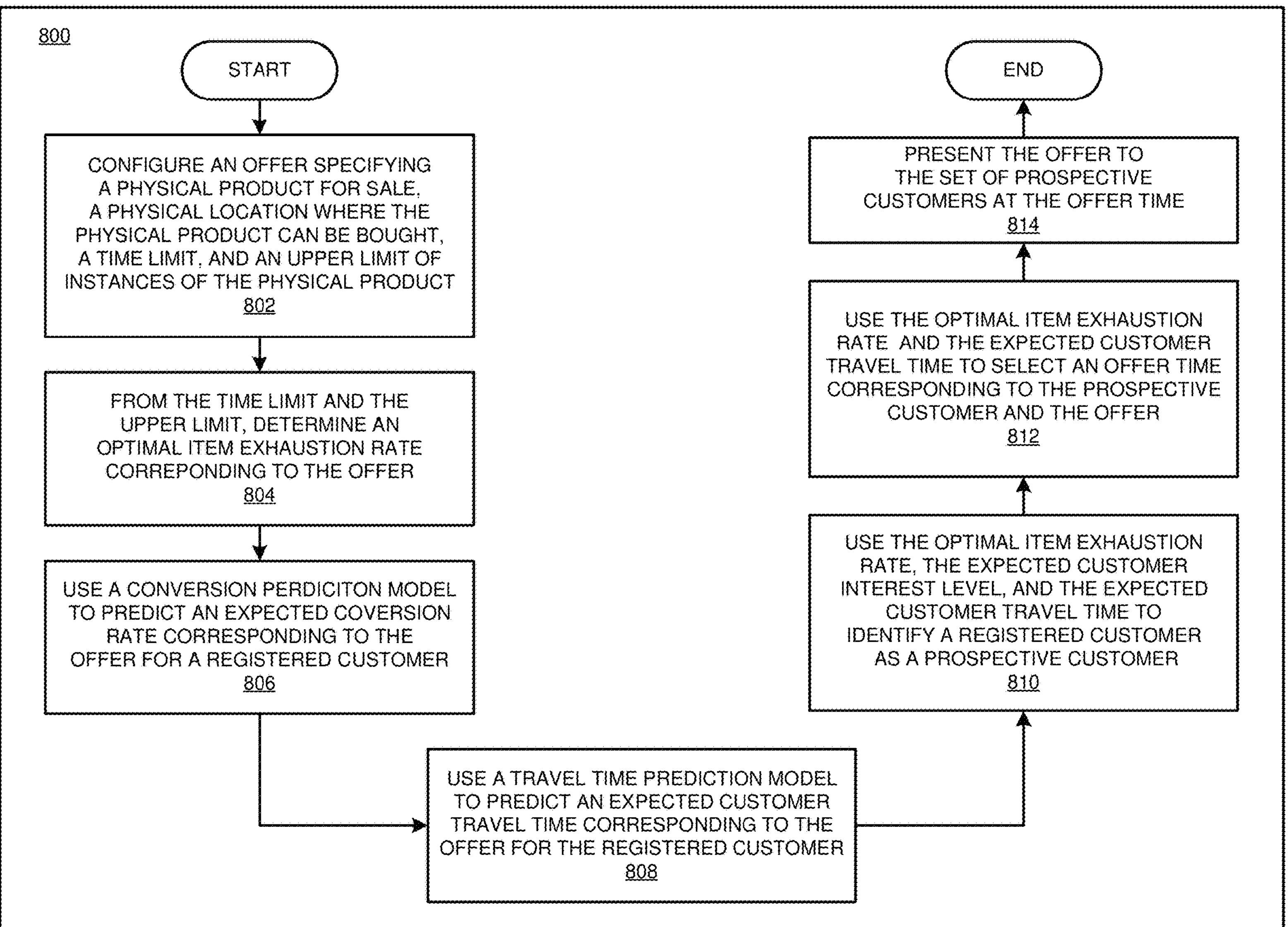
FIGURE 8
800
START
CONFIGURE AN OFFER SPECIFYING A PHYSICAL PRODUCT FOR SALE, A PHYSICAL LOCATION WHERE THE PHYSICAL PRODUCT CAN BE BOUGHT, A TIME LIMIT, AND AN UPPER LIMIT OF INSTANCES OF THE PHYSICAL PRODUCT 802
FROM THE TIME LIMIT AND THE UPPER LIMIT, DETERMINE AN OPTIMAL ITEM EXHAUSTION RATE CORREPONDING TO THE OFFER 804
USE A CONVERSION PERDICITON MODEL TO PREDICT AN EXPECTED COVERSION RATE CORRESPONDING TO THE OFFER FOR A REGISTERED CUSTOMER 806
USE A TRAVEL TIME PREDICTION MODEL TO PREDICT AN EXPECTED CUSTOMER TRAVEL TIME CORRESPONDING TO THE OFFER FOR THE REGISTERED CUSTOMER 808
USE THE OPTIMAL ITEM EXHAUSTION RATE, THE EXPECTED CUSTOMER INTEREST LEVEL, AND THE EXPECTED CUSTOMER TRAVEL TIME TO IDENTIFY A REGISTERED CUSTOMER AS A PROSPECTIVE CUSTOMER 810
USE THE OPTIMAL ITEM EXHAUSTION RATE AND THE EXPECTED CUSTOMER TRAVEL TIME TO SELECT AN OFFER TIME CORRESPONDING TO THE PROSPECTIVE CUSTOMER AND THE OFFER 812
PRESENT THE OFFER TO THE SET OF PROSPECTIVE CUSTOMERS AT THE OFFER TIME 814
END

POINT OF PURCHASE BASED PHYSICAL ITEM OFFER OPTIMIZATION

TECHNICAL FIELD

The present invention relates generally to a method, system, and computer program product for physical item offer optimization. More particularly, the present invention relates to a method, system, and computer program product for point of purchase based physical item offer optimization.

BACKGROUND

Despite the growth of online commerce, offline commerce, involving physical, or brick and mortar, locations, is still an important commercial sector. As used herein, offline commerce refers to commerce involving at least one physical location where customers can physically view an item before buying it. While online commerce involves pictures or text descriptions of an item available for purchase, offline commerce includes access to a physical item. In offline commerce, customers can assess a physical item's characteristics in person, quickly answering questions such as: Does this piece of clothing fit? Is this nut the right size for this bolt? Does this fabric feel soft? Is this fruit ripe? Is this coat warm enough? As well, customers need not wait for shipping, providing immediate gratification.

SUMMARY

The illustrative embodiments provide a method, system, and computer program product. An embodiment includes a method that configures an offer, the offer specifying a physical product for sale, a physical location where the physical product can be bought, a time limit, and an upper limit of instances of the physical product. An embodiment determines, from the time limit and the upper limit, an optimal item exhaustion rate corresponding to the offer, the optimal item exhaustion rate distributing customer visits to the physical location throughout a time range corresponding to the offer. An embodiment forecasts, for a registered customer in a set of registered customers using a conversion prediction model, an expected conversion rate corresponding to the offer. An embodiment forecasts, for the registered customer using a travel time prediction model, an expected customer travel time corresponding to the offer. An embodiment computes, using the optimal item exhaustion rate, the expected customer interest level, and the expected customer travel time, the registered customer as a prospective customer. An embodiment selects, using the optimal item exhaustion rate and the expected customer travel time, an offer time corresponding to the prospective customer and the offer, the offer time selected to allow the prospective customer to arrive at the physical location at a time consistent with the optimal exhaustion rate, the time being before the time limit and before a number of sold instances of the physical product exceeds the upper limit. An embodiment transmits, to a device associated with the prospective customer at the offer time, the offer.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a flowchart of an example process for point of purchase based physical item offer optimization in accordance with an illustrative embodiment.

DETAILED DESCRIPTION

Figure 1:
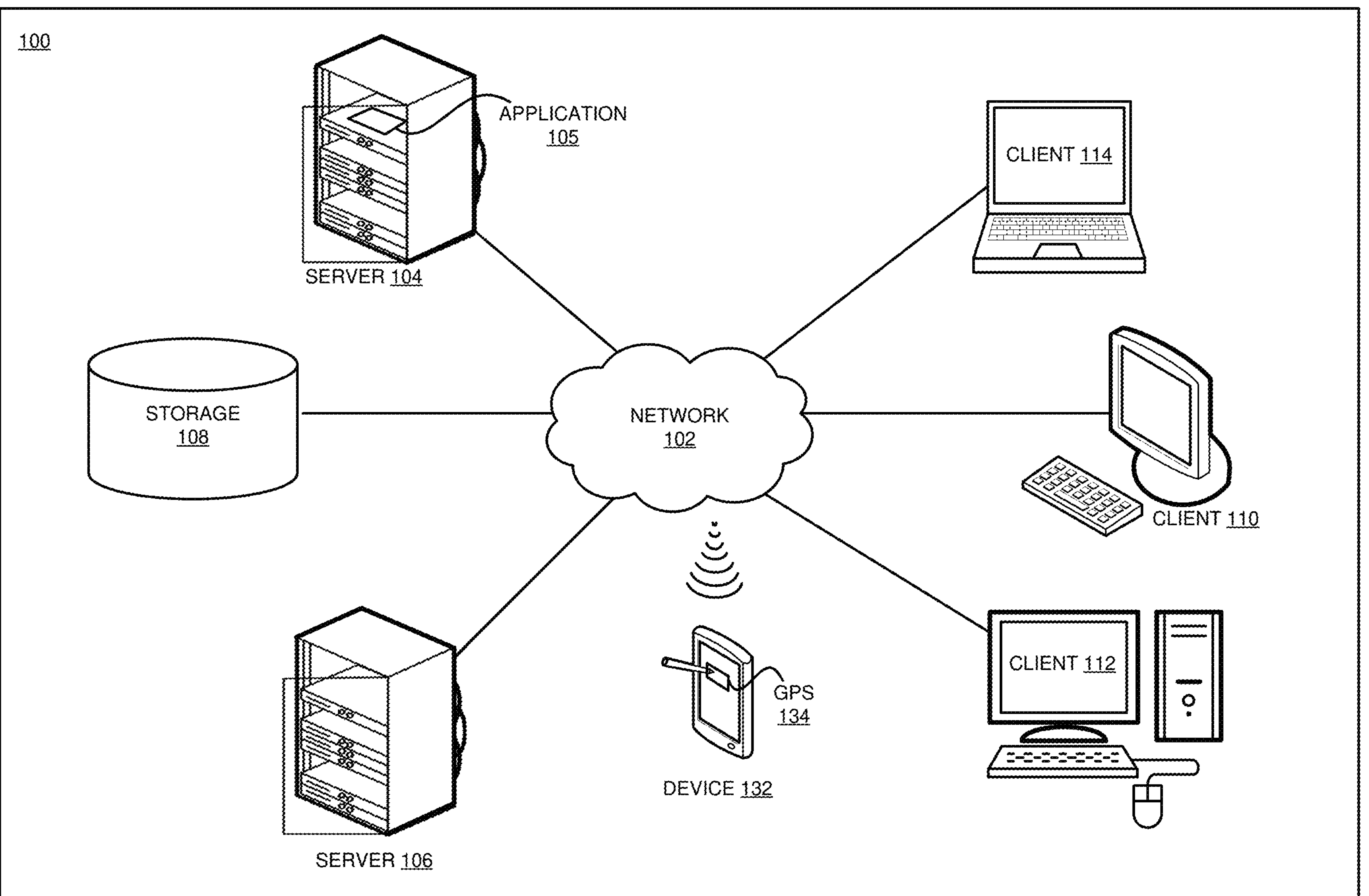
FIG. 1 depicts a block diagram of a network of data processing systems in which illustrative embodiments may be implemented.

The illustrative embodiments recognize that, because a physical shopping location has a fixed size such a location can accommodate a maximum number of customers at one time. If the location becomes too crowded, customers will be unable to maneuver around the location, assess the physical items available for purchase, and experience long wait times for assistance and to make a purchase. In addition, a too-large crowd can be hazardous to both customers and staff. As a result, if the location becomes too crowded, customers are likely to have an adverse customer experience. A physical shopping location typically also incurs costs associated with maintaining the physical location, such as rent, utilities, and salaries for staff. As a result, maintaining a physical shopping location requires that at least a certain number of customers visit and make a purchase per unit of time. Thus, the illustrative embodiments recognize that both having too few and too many customers at a time in a physical shopping location is inefficient.

The illustrative embodiments also recognize that one effective technique for increasing sales is to offer limited-time discounts on a limited quantify of items. A non-limiting example of such an offer might be that, between midnight and 4 am, a particular model of television is discounted by fifty percent, and that the offer expires after 200 items of this particular model of television have been sold at the discounted price. Another non-limiting example of such an offer might be that, today only, a liter of milk is discounted by one dollar. However, the store only has 500 liters of milk in stock to sell today.

The illustrative embodiments recognize that customers, seeking to take advantage of limited-time, limited-quantity offers, may all arrive at the physical store at once, resulting in too many customers at a time. Conversely, customers may assume the item has already sold out and not visit the store at all, resulting in too few customers at another time. In addition, the illustrative embodiments also recognize that customers find sales offers they are not interested in, or cannot take advantage of for another reason, annoying. For example, a customer may want to purchase the offered item but arrive at the store too late, after the item has already sold out, or be too far away to travel to the store before the item sells out or the offer expires.

Furthermore, not all customers who receive an offer actually end up buying the offered item after viewing the item at the store. The illustrative embodiments recognize that when limited-time limited quantity items are offered in a promotion, maximizing the conversion of the offer to a sale is advantageous. Accordingly, the illustrative embodiments recognize that the offer should be extended to customers who exhibit a greater likelihood as compared to other customers of converting the offer to a sale transaction involving the item, even if those higher likelihood customers are less ideally situated relative to the store. Thus, there is a need to target limited-time, limited-quantity offers to only those customers that are likely to be interested in and likely to be able to take advantage of the offers, while managing the timing of such offers to avoid having too many or too few customers at a time.

The illustrative embodiments recognize that the presently available tools or solutions do not address these needs or provide adequate solutions for these needs. The illustrative embodiments used to describe the invention generally address and solve the above-described problems and other problems related to point of purchase based physical item offer optimization.

An embodiment can be implemented as a software application. The application implementing an embodiment can be configured as a modification of an existing shopping system, as a separate application that operates in conjunction with an existing shopping system, a standalone application, or some combination thereof.

Particularly, some illustrative embodiments provide a method by which a limited-time, limited-quantity offer of a physical item can be presented to an interested customer at a time when the customer can take advantage of the offer.

An embodiment configures a limited-time, limited-quantity offer of a physical item for purchase at a physical location. Configuration includes setting one or more of a time at which the offer expires or a duration of the offer, an upper limit of physical items that can be purchased using the offer, and a physical location at which a physical item can be purchased using the offer. An offer can also be configured to include additional offer terms, for example a limit on a number of items a single customer is allowed to purchase, a time at which the offer starts, an additional item required to be purchased with the offered item (e.g. buy one get one free, or buy Product A to get Product B at a discount), or which customers can accept the offer (e.g. only those 65 or over).

An embodiment determines, from the time limit and the upper limit, an optimal exhaustion rate corresponding to the offer. An exhaustion rate is a rate at which customers purchase the item under terms of the offer. An optimal exhaustion rate is a desired exhaustion rate, determined so as to distribute customers' visits to the location to purchase the item throughout the time range of the offer. Determining an optimal exhaustion rate avoids time periods when the location has too many customers for a positive customer experience, and also avoids time periods when the location has too few customers for efficiency.

One example of an optimal exhaustion rate divides the number of items in the offer by the time range of the offer, thus distributing sales evenly across the time range of the offer. For example, if there are 200 items of a particular model of television offered at a discount between midnight and 4 am, an optimal exhaustion rate might be 200 divided by four, or fifty items per hour.

An embodiment can be configured to determine an optimal exhaustion rate using additional factors. Non-limiting examples of additional factors are a number of staff available to serve customers, a number of point of sale terminals with which customers can purchase items, and a rate at which items can be moved from a storage location to where customers are located.

An embodiment can be configured to determine multiple optimal exhaustion rates. For example, for an offer that spans a whole day, a store manager might have more staff available to serve customers in the afternoons and evenings, and thus might desire one optimal exhaustion rate for morning hours and another optimal exhaustion rate for afternoon and evening hours.

An embodiment has access to information about a set of registered customers. Registered customers have previously registered with a shopping system, indicating their willingness to receive limited-time, limited-quantity offers of physical items for sale at one or more physical locations. Registered customers have also assented to receiving offers through one or more means of receiving electronic information, such as by email, text message, social media communication, or being directed to a website or social media presence. Registered customer information can include access to real-time geolocation information for a customer, for example using real-time latitude and longitude information provided by a customer device with Global Positioning System (GPS) or another real-time geolocation capability. Alternatively, a customer can manually provide his or her current location.

An embodiment uses a conversion prediction model to predict an expected conversion rate corresponding to the offer, for a registered customer in the set of registered customers. An expected conversion rate is a likelihood that a particular customer will use a particular offer to purchase a particular product. To predict an expected conversion rate, the conversion prediction model uses information a registered customer has provided to the shopping system, such as an interest in receiving offers on particular products or a particular category of products, or lifestyle interests. To predict an expected conversion rate, the conversion prediction model also uses additional customer information recorded in the shopping system, such as a customer's purchase history or a customer's history of accepting or rejecting previous offers. To predict an expected conversion rate, the conversion prediction model uses additional customer information available by other means, such as social media postings, website visits, and other publicly available customer information or, with permission, messages, email, and other customer communications. For example, if a customer has previously announced an upcoming ski trip or visited several skiing-related websites, this customer might be interested in an offer for ski equipment. The conversion prediction model can use any suitable prediction technique.

In addition, the conversion prediction model can be configured to learn from customers' action in response to new offers, thus improving the model over time.

An embodiment uses a travel time prediction model to predict an expected customer travel time corresponding to the offer, for a registered customer. The expected customer travel time is the time a customer is expected to take to travel from his or her current location to the physical location where the item offered is available. To predict an expected customer travel time, the travel time prediction model uses a customer's real-time geolocation information, as provided to a shopping system. The travel time prediction model also uses additional customer information, either recorded in the shopping system or obtained through other means, such as modes of transportation the customer typically uses or the mode of transportation the customer is currently using. For example, if a customer's device is moving at about three miles per hour, the customer might be walking. If the customer's device is moving at ten miles per hour, the customer might be running, or bicycling. If the customer's device is moving at sixty miles per hour, the customer might be in a car moving on a traffic-free highway. The travel time prediction model also uses additional information, if available, such as current or expected traffic, current or expected weather, the presence of special events, and other information that can affect travel time. For example, rush hour traffic or heavy rain can increase a customer's travel time.

An embodiment can also use the expected travel time to predict or modify the expected conversion rate. For example, a customer may have a history indicating that he or she has one likelihood of purchasing an offered item when he or she is within fifteen minutes of the offer location, and another lower likelihood of purchasing when he or she would require more travel time to get to the location. Another customer might have a history of accepting similar offers, but is currently on vacation too far away to accept a current offer before the offer expires.

An embodiment uses the optimal item exhaustion rate, the expected customer interest level, and the expected customer travel time to identify a registered customer as a prospective customer. A prospective customer is a registered customer who has above a threshold likelihood of accepting the offer. Thus, a prospective customer is one who is expected to be sufficiently interested in the offer and sufficiently close to the offer location to arrive at the location at a time sufficiently consistent with the optimal item exhaustion rate.

An embodiment uses the optimal item exhaustion rate and the expected customer travel time to select an offer time for the offer, and presents the offer to a prospective customer at the offer time. An embodiment selects a prospective customer's offer time so as to allow the prospective customer to arrive at the physical location at a time before the offer expires and before a number of sold instances of the physical product exceeds the upper limit of the offer. For example, if a customer needs thirty minutes to travel to the location and make the purchase, the offer should be presented to the customer no later than thirty minutes before the offer's expiration. As another example, if a customer needs thirty minutes from now to travel to the location and make the purchase and the item is expected to sell out in two hours, the offer can be presented anytime in the next hour and a half. The time is also selected to conform with the optimal exhaustion rate. For example, if the offer can be presented anytime in the next hour and a half, but to conform with the optimal exhaustion rate more customers are needed in the next hour than at a later time, the offer should be presented to the prospective customer now.

An embodiment monitors the information used to determine the optimal item exhaustion rate, the expected customer interest level, and the expected customer travel time, as well as additional information relating to the offer, to adjust any of the optimal item exhaustion rate, the expected customer interest level, and the expected customer travel time, to determine an expected customer interest level and an expected customer travel time for a different registered customer, or to modify the offer for customers to which the offer has already been presented.

An embodiment adjusts the optimal item exhaustion rate based on an actual sales rate of the item offered. If the actual sales rate is higher than the optimal item exhaustion rate, more sales than expected have already occurred, and the optimal item exhaustion rate can be lowered to compensate. Conversely, if the actual sales rate is lower than the optimal item exhaustion rate, fewer sales than expected have already occurred, and the optimal item exhaustion rate can be raised to compensate.

An embodiment adjusts the upper limit on items to be sold, the time limit, or another offer term based on an actual sales rate of the item offered. Reducing the number of items to be sold can give an impression of scarcity, thus increasing a customer's sense of urgency and improving sales, or minimizing lost profits if an offer is more successful than expected. Adding to the number of items to be sold can give an impression that sufficient items are available, and thus that the item will be available for a customer who may have been hesitating about the offer. Increasing the time limit can allow customers more time to accept the offer, and increasing the discount can improve the offer's desirability, also potentially improving an item's sales rate. One embodiment performs the adjustments using a set of rules. One non-limiting example of such a rule is that if sales are twenty percent less than expected for a particular time period, increase the discount of the offer by five percent, the increased discount being applicable for a predetermined period. An embodiment forecasts a period over which the increased discount is forecasted to relevel the exhaustion rate up to a desired exhaustion rate, and uses that forecasted period as the predetermined period for the increased discount. Within the scope of the illustrative embodiments, the forecasted period can be based on other factors, including but not limited to bringing the item exhaustion rate to a desired level, changing the number of customers that can be present simultaneously at the store, adjusting an inventory due to loss or replenishment of the offered item, changing weather or traffic conditions that affects a set of customers in coming to the store location, and many other factors.

Another embodiment performs the adjustments using a model that analyzes historical offer adjustment patterns, and selects an adjustment for a current offer based on a set of factors. The set of factors can include, for example, the type of item, the discount offered, the upper limit on items to be sold, the time limit on the offer, the time or date of the offer, and a characteristic of the set of prospective customers already presented with the offer.

An embodiment adjusts the expected customer conversion rate based on the customer's information, either provided to a shopping system or obtained in another manner. One embodiment enables a customer to respond to an offer, either expressing interest or expressing disinterest directly to the shopping system. Another embodiment monitors a customer's social media and other online communications during a time period after the offer is presented, to determine the customer's response. to the offer. For example, a customer's sharing of details of the offer with a group of his or her social media contacts can indicate a particular level of interest in the offer. Another embodiment monitors online activity related to the customer or the offer. For example, if there is a spike in online activity discussing a particular television model that is the subject of a current offer, an embodiment can infer that at least some people, including registered customers, are interested in an offer for that particular television model.

An embodiment adjusts the expected customer travel time based on updated customer information, such as a mode of transportation the customer is currently using. For example, if a customer normally drives but is now walking, travel time will likely be higher. An embodiment also adjusts the expected customer travel time based on updated additional information, if available, such as updated traffic, updated weather, and other information that can affect travel time.

An embodiment monitors the information used to determine the optimal item exhaustion rate, the expected customer interest level, and the expected customer travel time to determine an expected customer interest level and an expected customer travel time for a different registered customer. For example, if actual sales of the item are lower than expected, the optimal exhaustion rate may have changed. As another example, higher-than-expected travel time may be preventing prospective customers from arriving at the location. Thus, an embodiment selects a new prospective customer who is expected to be sufficiently interested in the offer and, using updated parameters, sufficiently close to the offer location to arrive at the location at a time sufficiently consistent with the new optimal item exhaustion rate.

An embodiment monitors the information used to determine the optimal item exhaustion rate, the expected customer interest level, and the expected customer travel time to modify, if appropriate, the offer for customers to which the offer has already been presented. For example, a prospective customer may be en route to the location of the offer, but higher-than-expected travel time may be preventing a prospective customer from arriving before the offer expires. As a result, an embodiment notifies the prospective customer of the situation, preventing the customer from completing a wasted journey. As another example, a prospective customer may be en route to the location of the offer, but due to higher-than-expected sales the offer has already sold out. As a result, an embodiment notifies the prospective customer of the situation, but offers the customer a new location at which items of the offer will still be available when the customer arrives at the new location.

The manner of point of purchase based physical item offer optimization described herein is unavailable in the presently available methods in the technological field of endeavor pertaining to procurement management of physical items. A method of an embodiment described herein, when implemented to execute on a device or data processing system, comprises substantial advancement of the functionality of that device or data processing system in predicting an expected conversion rate corresponding to an offer and an expected conversion rate and an expected travel time for a registered customer and using the a expected conversion rate, expected conversion rate, and expected travel time to identify a prospective customer and select an time at which to present the offer to the prospective customer.

The illustrative embodiments are described with respect to certain types of rates, conditions, predictions, forecasts, thresholds, responses, rankings, adjustments, modifications, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
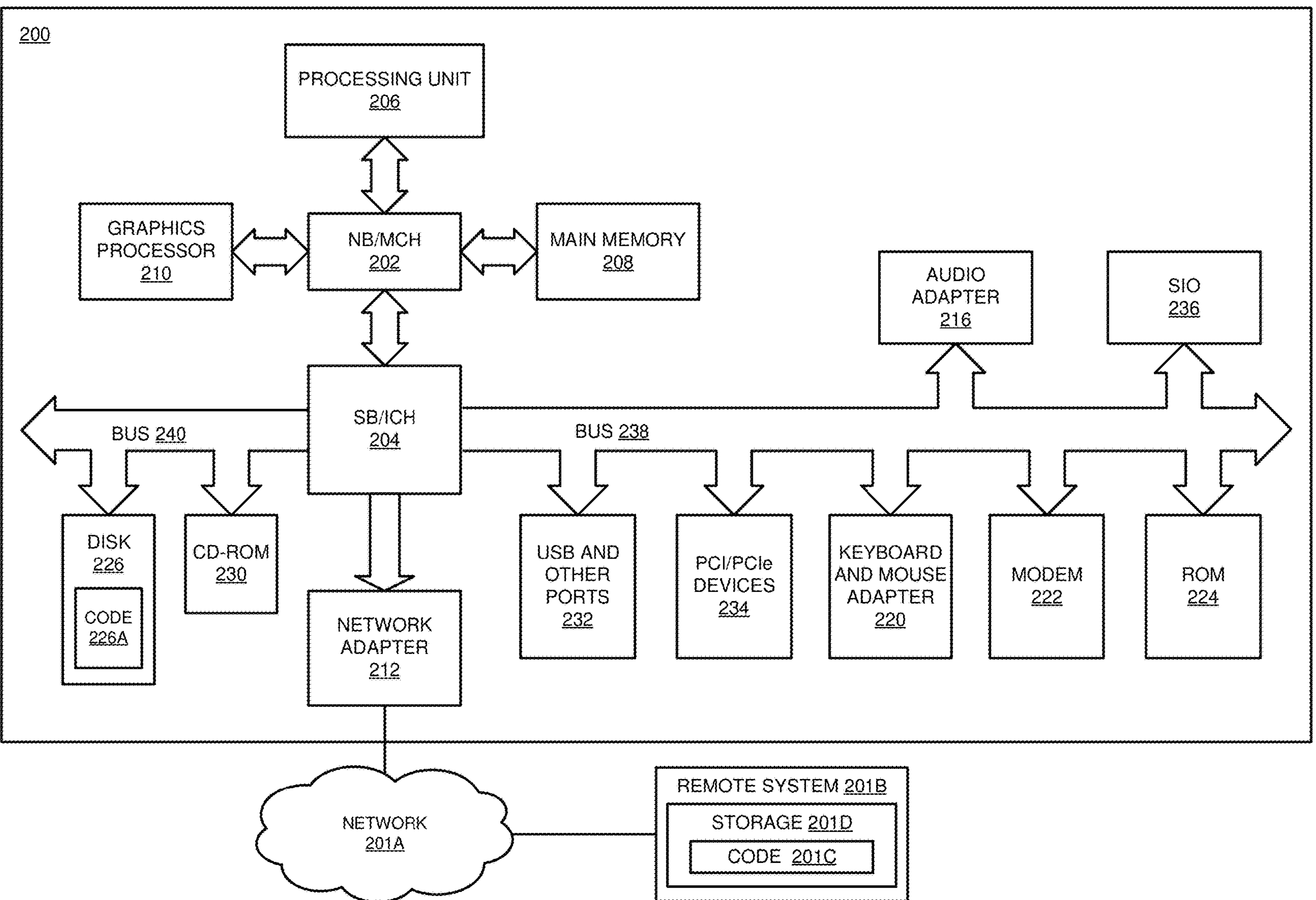
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes GPS 134, which provides geo-location information for device 132.

Application 105 implements an embodiment described herein. Application 105 can execute in any of servers 104 and 106, clients 110, 112, and 114, and device 132. Application 105 can also send an offer for presentation to a prospective customer, in a manner disclosed herein, to any device, for example clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
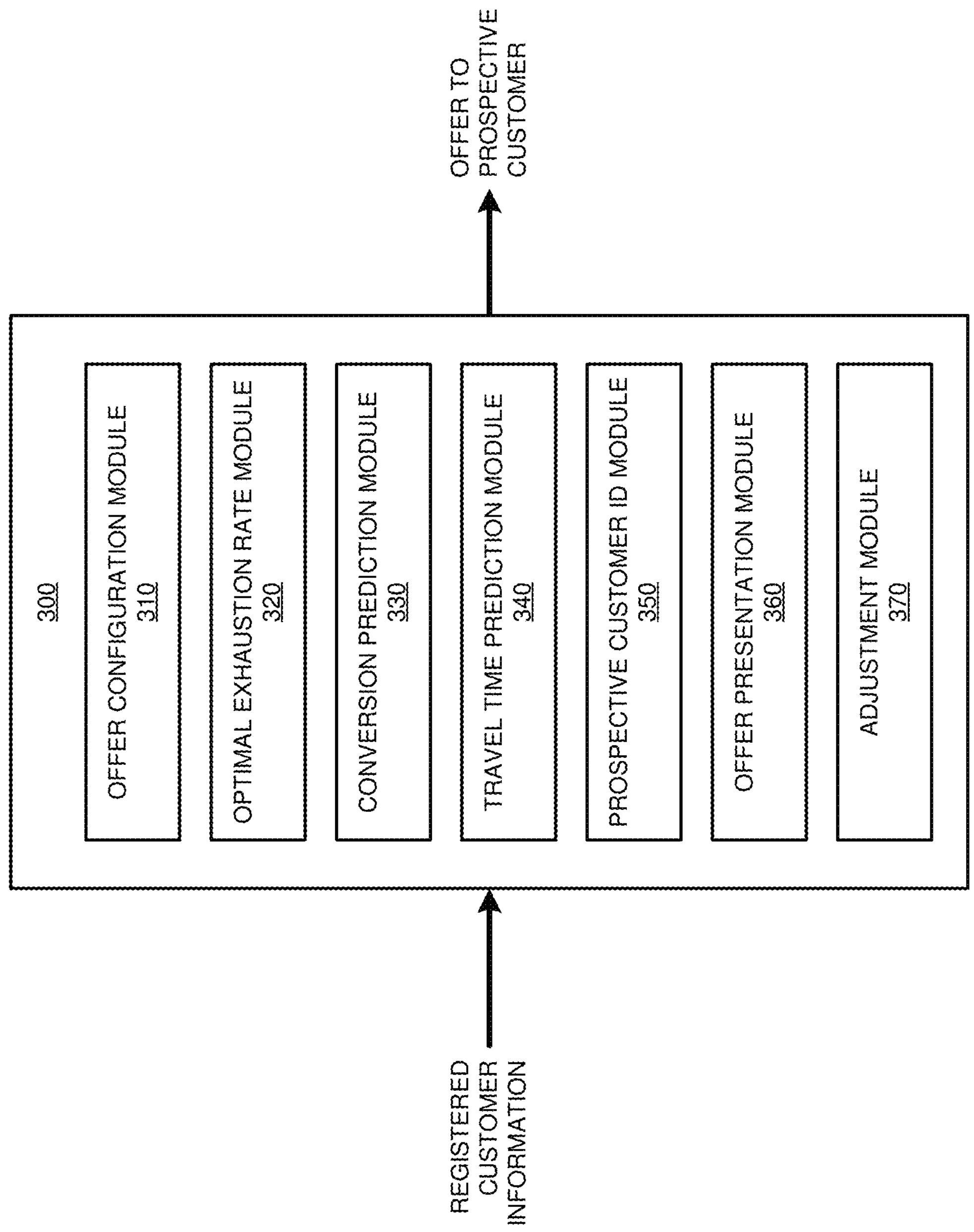
FIG. 3 depicts a block diagram of an example configuration for point of purchase based physical item offer optimization in accordance with an illustrative embodiment.

With reference to FIG. 3, this figure depicts a block diagram of an example configuration for point of purchase based physical item offer optimization in accordance with an illustrative embodiment. Application 300 is an example of application 105 in FIG. 1 and executes in any of execute in any of servers 104 and 106, clients 110, 112, and 114, and device 132 in FIG. 1.

Offer configuration module 310 configures a limited-time, limited-quantity offer of a physical item for purchase at a physical location. Configuration includes setting one or more of a time at which the offer expires or a duration of the offer, an upper limit of physical items that can be purchased using the offer, and a physical location at which a physical item can be purchased using the offer. An offer can also be configured to include additional offer terms, for example a limit on a number of items a single customer is allowed to purchase, a time at which the offer starts, an additional item required to be purchased with the offered item, or which customers can accept the offer.

Optimal exhaustion module 320 determines, from the time limit and the upper limit, an optimal exhaustion rate corresponding to the offer. An optimal exhaustion rate is a desired exhaustion rate, determined so as to distribute customers' visits to the location to purchase the item throughout the time range of the offer. Determining an optimal exhaustion rate avoids time periods when the location has too many customers for a positive customer experience, and also avoids time periods when the location has too few customers for efficiency.

Conversion prediction module 330 uses a conversion prediction model to predict an expected conversion rate corresponding to the offer, for a registered customer in the set of registered customers. An expected conversion rate is a likelihood that a particular customer will use a particular offer to purchase a particular product. To predict an expected conversion rate, the conversion prediction model uses information a registered customer has provided to the shopping system. To predict an expected conversion rate, the conversion prediction model also uses additional customer information recorded in the shopping system, such as a customer's purchase history or a customer's history of accepting or rejecting previous offers. To predict an expected conversion rate, the conversion prediction model also uses additional customer information available by other means, such as social media postings, website visits, and other publicly available customer information or, with permission, messages, email, and other customer communications. The conversion prediction model can use any suitable prediction technique. In addition, the conversion prediction model can be configured to learn from customers' action in response to new offers, thus improving the model over time.

Travel time prediction module 340 uses a travel time prediction model to predict an expected customer travel time corresponding to the offer, for a registered customer. To predict an expected customer travel time, the travel time prediction model uses a customer's real-time geolocation information, as provided to a shopping system. The travel time prediction model also uses additional customer information, either recorded in the shopping system or obtained through other means, such as modes of transportation the customer typically uses or the mode of transportation the customer is currently using. The travel time prediction model also uses additional information, if available, such as current or expected traffic, current or expected weather, the presence of special events, and other information that can affect travel time. Conversion prediction module 330 can also use the expected travel time to predict or modify the expected conversion rate.

Prospective customer identification module 350 uses the optimal item exhaustion rate, the expected customer interest level, and the expected customer travel time to identify a registered customer as a prospective customer. A prospective customer is one who is expected to be sufficiently interested in the offer and sufficiently close to the offer location to arrive at the location at a time sufficiently consistent with the optimal item exhaustion rate.

Offer presentation module 360 uses the optimal item exhaustion rate and the expected customer travel time to select an offer time for the offer, and presents the offer to a prospective customer at the offer time. Module 360 selects a prospective customer's offer time so as to allow the prospective customer to arrive at the physical location at a time before the offer expires and before a number of sold instances of the physical product exceeds the upper limit of the offer. Module 360 also selects an offer time that conforms with the optimal exhaustion rate.

Adjustment module 370 monitors the information used to determine the optimal item exhaustion rate, the expected customer interest level, and the expected customer travel time, as well as additional information relating to the offer, to adjust any of the optimal item exhaustion rate, the expected customer interest level, and the expected customer travel time, to determine an expected customer interest level and an expected customer travel time for a different registered customer, or to modify the offer for customers to which the offer has already been presented. Adjustment module 370 uses module 320 to adjust the optimal item exhaustion rate based on an actual sales rate of the item offered. Adjustment module 370 adjusts the upper limit on items to be sold, the time limit, or another offer term based on an actual sales rate of the item offered, using a set of rules or by analyzing historical offer adjustment patterns and selecting an adjustment for a current offer based on a set of factors. The set of factors can include, for example, the type of item, the discount offered, the upper limit on items to be sold, the time limit on the offer, the time or date of the offer, and a characteristic of the set of prospective customers already presented with the offer.

Adjustment module 370 uses module 330 to adjust the expected customer conversion rate based on the customer's information, either provided to a shopping system or obtained in another manner. One implementation of module 370 enables a customer to respond to an offer, either expressing interest or expressing disinterest. Another implementation of module 370 monitors a customer's social media and other online communications during a time period after the offer is presented, to determine the customer's reaction to the offer. Another implementation of module 370 monitors online activity related to the customer or the offer.

Adjustment module 370 uses module 340 to adjust the expected customer travel time based on updated customer information, such as a mode of transportation the customer is currently using. Adjustment module 370 uses module 340 to adjust the expected customer travel time based on updated additional information, if available, such as updated traffic, updated weather, and other information that can affect travel time.

Application 300 monitors the information used to determine the optimal item exhaustion rate, the expected customer interest level, and the expected customer travel time to determine an expected customer interest level and an expected customer travel time for a different registered customer. Adjustment module 370 monitors the information used to determine the optimal item exhaustion rate, the expected customer interest level, and the expected customer travel time to modify, if appropriate, the offer for customers to which the offer has already been presented.

Figure 4:
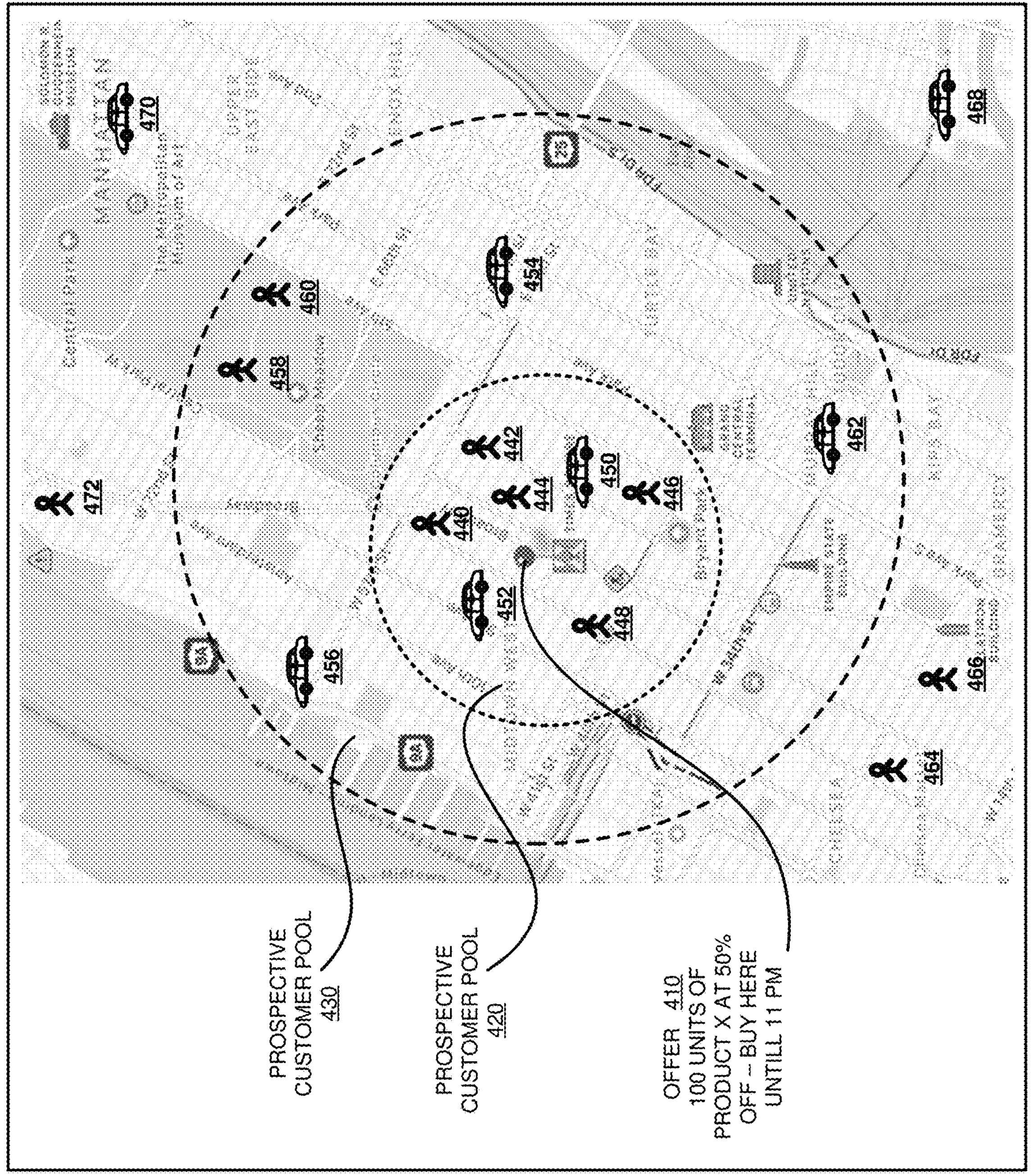
FIG. 4 depicts an example of point of purchase based physical item offer optimization in accordance with an illustrative embodiment.

With reference to FIG. 4, this figure depicts an example of point of purchase based physical item offer optimization in accordance with an illustrative embodiment. The example can be executed using application 300 in FIG. 3.

As depicted, application 300 has configured offer 410: a limited-time, limited-quantity offer of a physical item for purchase at a physical location. Here, 100 units of Product X are available for purchase at fifty percent off at the indicated physical location until 11 pm. Application 300 determines, from the time limit and the upper limit, an optimal exhaustion rate corresponding to the offer. Application 300 uses a conversion prediction model to predict an expected conversion rate corresponding to the offer, for a registered customer. Application 300 uses a conversion prediction model to predict an expected conversion rate corresponding to the offer, for a registered customer. Application 300 also uses a travel time prediction model to predict an expected customer travel time corresponding to the offer, for a registered customer.

Application 300 uses the optimal item exhaustion rate, the expected customer interest level, and the expected customer travel time to identify a registered customer as a prospective customer. A prospective customer is a registered customer who has above a threshold likelihood of accepting the offer. As depicted, application 300 has identified prospective customer pool 420, including pedestrians 440, 442, 444, 446, and 448 and car passengers 450 and 452. All are expected to be sufficiently interested in the offer and sufficiently close to the offer location to arrive at the location at a time sufficiently consistent with the optimal item exhaustion rate. As depicted, application 300 has also identified prospective customer pool 430, including car passengers 454, 456, and 462. Because car passengers 454, 456, and 462 are in vehicles, their expected travel time is sufficiently short that they can also arrive at the location at a time sufficiently consistent with the optimal item exhaustion rate. However, pedestrians 458, 460, and 462, while sufficiently interested in the offer, are too far away, in terms of travel time, to arrive at the offer location in time. As a result, pedestrians 458, 460, and 462 are not in prospective customer pool 430. In addition, pedestrians 464, 466, and 472, as well as car passengers 468 and 470 are either not sufficiently interested in the offer, too far away, in terms of travel time, to arrive at the offer location in time, or both, and are not identified as prospective customers. Thus, application 300 uses the optimal item exhaustion rate and the expected customer travel time to select offer times for those identified as prospective customers, and presents offer 410 to one or more of pedestrians 440, 442, 444, 446, and 448 and car passengers 450, 452, 454, 456, and 462 at an prospective customer-specific offer time.

Figure 5:
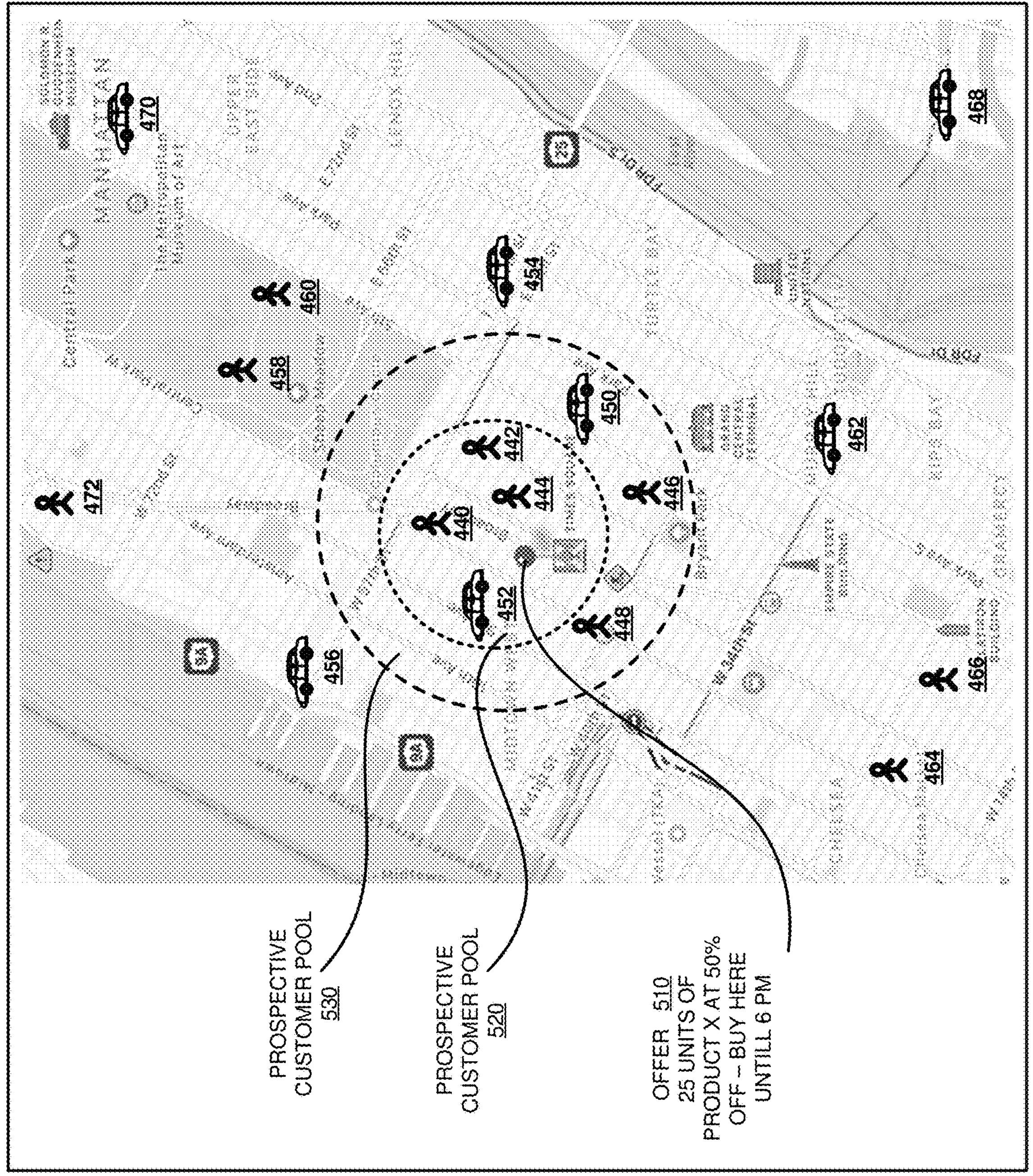
FIG. 5 depicts an example of point of purchase based physical item offer optimization in accordance with an illustrative embodiment.

With reference to FIG. 5, this figure depicts an example of point of purchase based physical item offer optimization in accordance with an illustrative embodiment. The example can be executed using application 300 in FIG. 3. Pedestrians 440, 442, 444, 446, 448, 458, 460, 462, 464, 466, and 472 and car passengers 450, 452, 454, 456, 462, 468 and 470 are the same as pedestrians 440, 442, 444, 446, 448, 458, 460, 462, 464, 466, and 472 and car passengers 450, 452, 454, 456, 462, 468 and 470 in FIG. 4.

As depicted, sales have been higher than expected, and application 300 has adjusted the offer accordingly, creating offer 510. Offer 510 includes fewer items than offer 410 (25 instead of 100) and a shorter time limit (6 pm instead of 11 pm). As a result, prospective customer pool 520 now includes pedestrians 440, 442, 444, and car passenger 452. All are expected to be sufficiently interested in the offer and sufficiently close to the offer location to arrive at the location at a time sufficiently consistent with the optimal item exhaustion rate computed for the updated item and time limits. In addition, prospective customer pool 530 includes car passenger 450, who is also sufficiently interested in the offer and sufficiently close to the offer location to arrive at the location at a time sufficiently consistent with the optimal item exhaustion rate computed for the updated item and time limits. Because pedestrians 446, and 448 and car passengers 454, 456, and 462 can no longer arrive at the location of offer 510 before the offer expires, application 300 notifies these prospective customers accordingly.

Figure 6:
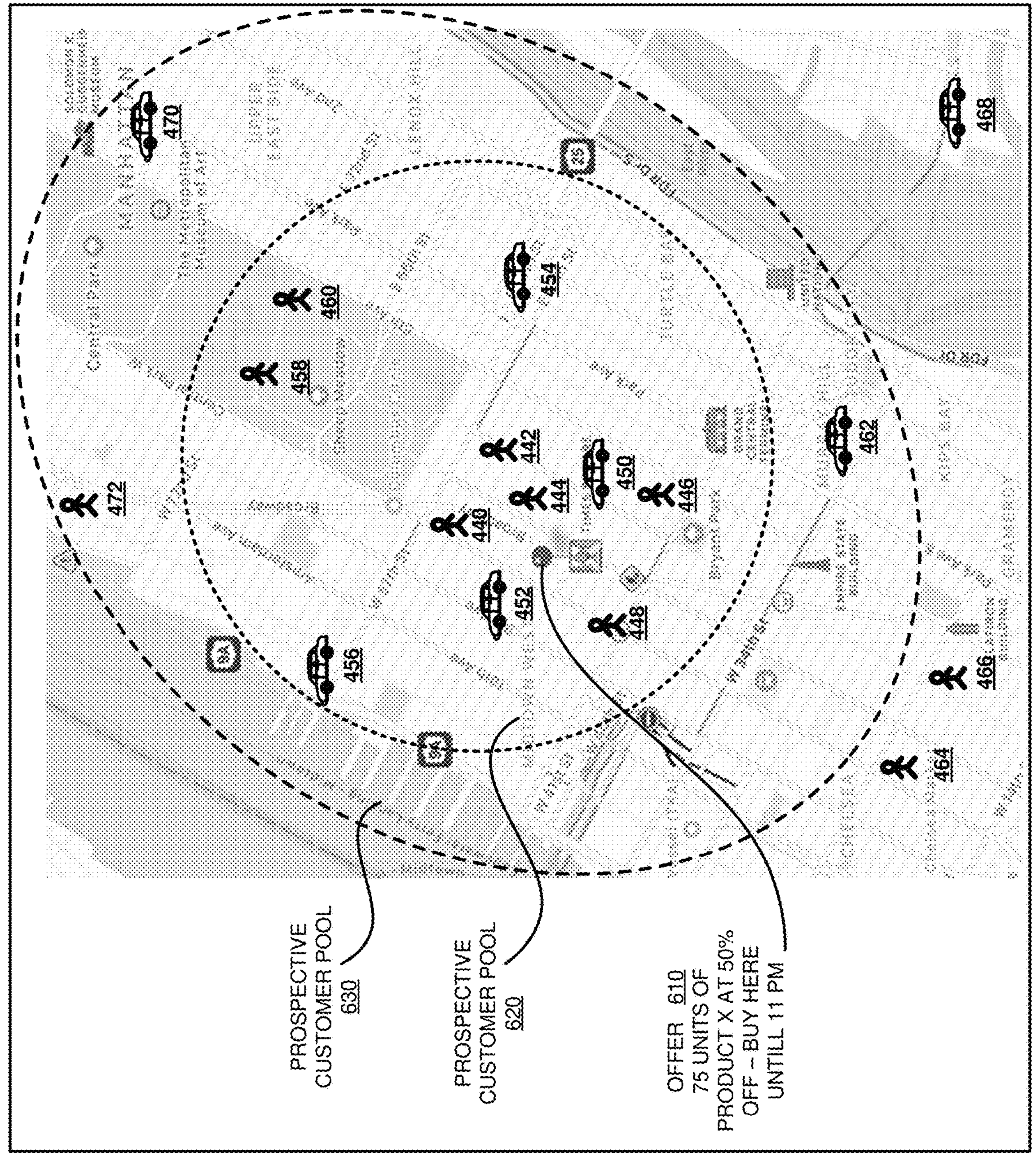
FIG. 6 depicts an example of point of purchase based physical item offer optimization in accordance with an illustrative embodiment.

With reference to FIG. 6, this figure depicts an example of point of purchase based physical item offer optimization in accordance with an illustrative embodiment. The example can be executed using application 300 in FIG. 3. Pedestrians 440, 442, 444, 446, 448, 458, 460, 462, 464, 466, and 472 and car passengers 450, 452, 454, 456, 462, 468 and 470 are the same as pedestrians 440, 442, 444, 446, 448, 458, 460, 462, 464, 466, and 472 and car passengers 450, 452, 454, 456, 462, 468 and 470 in FIG. 4.

As depicted, sales have been lower than expected, and application 300 has adjusted the offer accordingly, creating offer 610. Offer 610 includes fewer items than offer 410 (75 instead of 100, because some have been sold), but the same time limit as offer 410. As a result, application 300 has identified prospective customer pool 620, including pedestrians 440, 442, 444, 446, 448, 458, and 460 as well as car passengers 450 452, 454, and 456. In addition, prospective customer pool 630 includes car passengers 462 and 470, but not pedestrian 472 because pedestrian 472 is too far away, in terms of travel time while walking, to reach the location of offer 610 in time. Thus, because those in prospective customer pools 620 and 630 are expected to be sufficiently interested in the offer and sufficiently close to the offer location to arrive at the location at a time sufficiently consistent with the optimal item exhaustion rate computed for the updated item and time limits, application 300 generates either new or updated offers for these customers.

Figure 7:
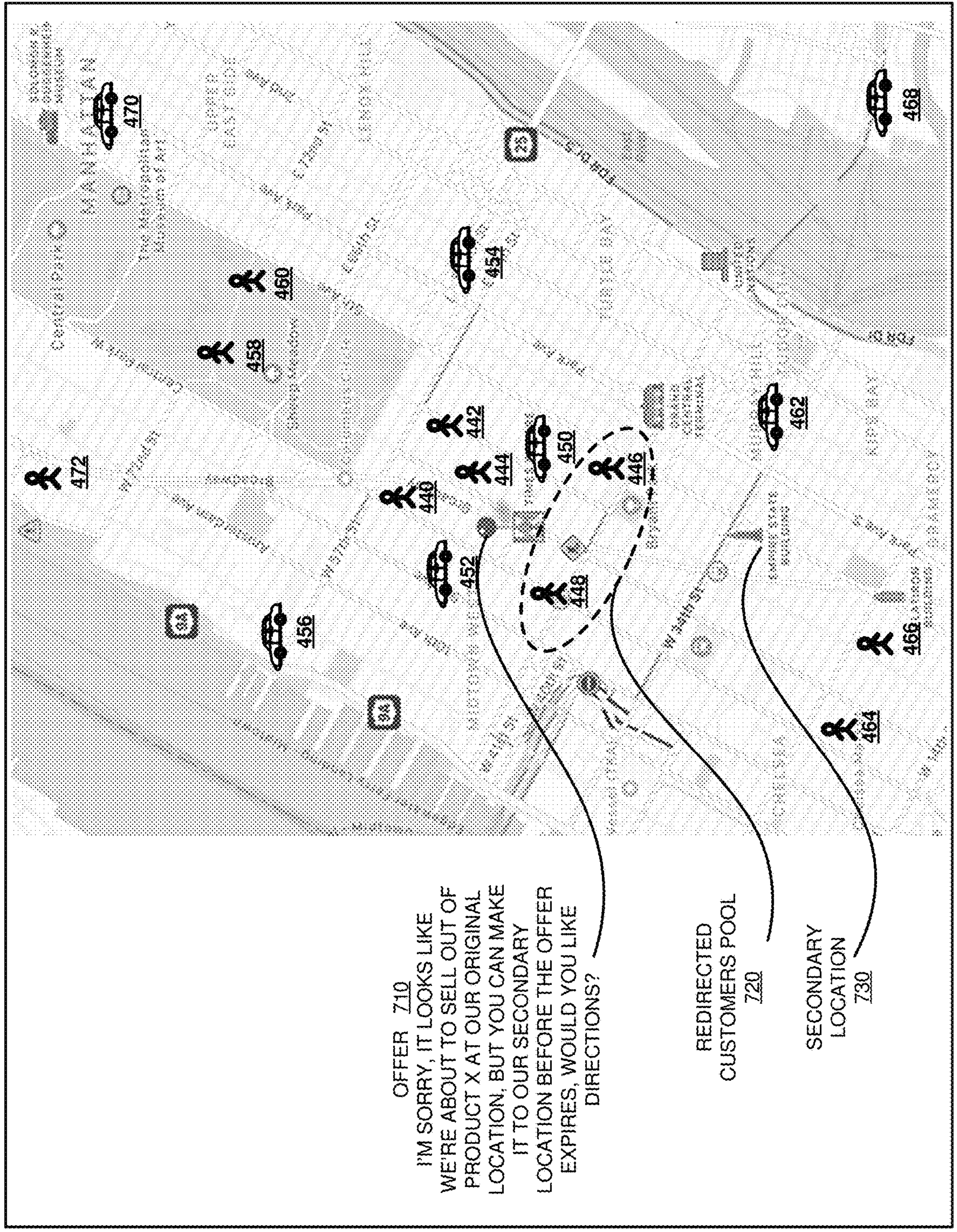
FIG. 7 depicts an example of point of purchase based physical item offer optimization in accordance with an illustrative embodiment.

With reference to FIG. 7, this figure depicts an example of point of purchase based physical item offer optimization in accordance with an illustrative embodiment. The example can be executed using application 300 in FIG. 3. Pedestrians 440, 442, 444, 446, 448, 458, 460, 462, 464, 466, and 472 and car passengers 450, 452, 454, 456, 462, 468 and 470 are the same as pedestrians 440, 442, 444, 446, 448, 458, 460, 462, 464, 466, and 472 and car passengers 450, 452, 454, 456, 462, 468 and 470 in FIG. 4.

As depicted, offer 710 notifies pedestrians 446 and 448, in redirected customers pool 720, that the item in offer 710 is about to sell out before pedestrians 446 and 448 are able to arrive at the location of offer 710. As a result, offer 710 suggests that pedestrians 446 and 448 proceed to secondary location 730 instead.

With reference to FIG. 8, this figure depicts a flowchart of an example process for point of purchase based physical item offer optimization in accordance with an illustrative embodiment. Process 800 can be implemented in application 300 in FIG. 3.

In block 802, the application configures an offer specifying a physical product for sale, a physical location where the physical product can be bought, a time limit, and an upper limit of instances of the physical product. In block 804, the application, from the time limit and the upper limit, determines an optimal item exhaustion rate corresponding to the offer. In block 806, the application uses a conversion prediction model to predict an expected conversion rate corresponding to the offer for a registered customer. In block 808, the application uses a travel time prediction model to predict an expected customer travel time corresponding to the offer for the registered customer. In block 810, the application uses the optimal item exhaustion rate, the expected customer interest level, and the expected customer travel time to identify a registered customer as a prospective customer. In block 812, the application uses the optimal item exhaustion rate and the expected customer travel time to select an offer time corresponding to the prospective customer and the offer. In block 814, the application presents the offer to the set of prospective customers at the offer time. Then the application ends.

Thus, a computer implemented method, system or apparatus, and computer program product are provided in the illustrative embodiments for point of purchase based physical item offer optimization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

configuring an offer, the offer specifying a physical product for sale, a physical location where the physical product can be bought, a time limit, and an upper limit of instances of the physical product;

determining, from the time limit and the upper limit, an optimal item exhaustion rate corresponding to the offer, the optimal item exhaustion rate comprising a rate at which the physical product is desired to be sold in response to the offer, the optimal item exhaustion rate evenly distributing customer visits to the physical location throughout a time range corresponding to the offer;

forecasting, for a registered customer in a set of registered customers using a conversion prediction model executed using a processor and a memory, an expected conversion rate corresponding to the offer;

forecasting, for the registered customer using a travel time prediction model executed using the processor and the memory, an expected customer travel time corresponding to the offer;

computing, using the processor and the memory, using the optimal item exhaustion rate, an expected customer interest level, and the expected customer travel time, the registered customer as a prospective customer;

selecting, using the optimal item exhaustion rate and the expected customer travel time, an offer time corresponding to the prospective customer and the offer, the offer time selected to allow the prospective customer to arrive at the physical location at a time consistent with the optimal item exhaustion rate, the time being before the time limit and before a number of sold instances of the physical product exceeds the upper limit; and transmitting, at the offer time to a device associated with the prospective customer, the offer.

2. The computer-implemented method of claim 1, further comprising:

adjusting, based on an actual sales rate of instances of the physical product, the optimal item exhaustion rate.

3. The computer-implemented method of claim 2, further comprising:

identifying, using the adjusted optimal item exhaustion rate, a second expected customer interest level predicted for a second registered customer, and a second expected customer travel time predicted for the second registered customer, the second registered customer as a second prospective customer;

selecting, using the adjusted optimal item exhaustion rate and the second expected customer travel time, a second offer time corresponding to the second prospective customer and the offer, the second offer time selected to allow the second prospective customer to arrive at the physical location at a second time consistent with the adjusted optimal item exhaustion rate, the second time being before the time limit and before the number of sold instances of the physical product exceeds the upper limit; and transmitting, to a second device associated with the second prospective customer at the second offer time, the offer.

4. The computer-implemented method of claim 1, further comprising:

adjusting, based on an actual sales rate of instances of the physical product, the offer.

5. The computer-implemented method of claim 4, wherein the adjusting is performed using a model, the model analyzing a set of historical offer adjustment patterns, the adjustment selected based on a set of factors.

6. The computer-implemented method of claim 1, further comprising:

adjusting, based on a response of the prospective customer to the offer, the offer.

7. The computer-implemented method of claim 1, further comprising:

adjusting, based on an analysis of a social media communication of the prospective customer in response to the offer, the offer.

8. The computer-implemented method of claim 1, further comprising:

adjusting, for the prospective customer using the travel time prediction model, the expected customer travel time; and modifying, using the optimal item exhaustion rate and the adjusted expected customer travel time, the offer time.

9. The computer-implemented method of claim 1, further comprising:

adjusting, for the prospective customer using the travel time prediction model, the expected customer travel time; and modifying, using the optimal item exhaustion rate and the adjusted expected customer travel time, the offer.

10. A computer usable program product comprising one or more computer-readable storage devices, and program instructions stored on at least one of the one or more storage devices, the stored program instructions comprising:

program instructions to configure an offer, the offer specifying a physical product for sale, a physical location where the physical product can be bought, a time limit, and an upper limit of instances of the physical product;

program instructions to determine, from the time limit and the upper limit, an optimal item exhaustion rate corresponding to the offer, the optimal item exhaustion rate comprising a rate at which the physical product is desired to be sold in response to the offer, the optimal item exhaustion rate evenly distributing customer visits to the physical location throughout a time range corresponding to the offer;

program instructions to forecast, for a registered customer in a set of registered customers using a conversion prediction model executed using a processor and a memory, an expected conversion rate corresponding to the offer;

program instructions to forecast, for the registered customer using a travel time prediction model executed using the processor and the memory, an expected customer travel time corresponding to the offer;

program instructions to compute, using the processor and the memory, using the optimal item exhaustion rate, an expected customer interest level, and the expected customer travel time, the registered customer as a prospective customer;

program instructions to select, using the optimal item exhaustion rate and the expected customer travel time, an offer time corresponding to the prospective customer and the offer, the offer time selected to allow the prospective customer to arrive at the physical location at a time consistent with the optimal item exhaustion rate, the time being before the time limit and before a number of sold instances of the physical product exceeds the upper limit; and program instructions to transmit, at the offer time to a device associated with the prospective customer, the offer.

11. The computer usable program product of claim 10, further comprising:

program instructions to adjust, based on an actual sales rate of instances of the physical product, the optimal item exhaustion rate.

12. The computer usable program product of claim 11, further comprising:

program instructions to identify, using the adjusted optimal item exhaustion rate, a second expected customer interest level predicted for a second registered customer, and a second expected customer travel time predicted for the second registered customer, the second registered customer as a second prospective customer;

program instructions to select, using the adjusted optimal item exhaustion rate and the second expected customer travel time, a second offer time corresponding to the second prospective customer and the offer, the second offer time selected to allow the second prospective customer to arrive at the physical location at a second time consistent with the adjusted optimal item exhaustion rate, the second time being before the time limit and before the number of sold instances of the physical product exceeds the upper limit; and program instructions to transmit, to a second device associated with the second prospective customer at the second offer time, the offer.

13. The computer usable program product of claim 10, further comprising:

program instructions to adjust, based on an actual sales rate of instances of the physical product, the offer.

14. The computer usable program product of claim 13, wherein the adjusting is performed using a model, the model analyzing a set of historical offer adjustment patterns, the adjustment selected based on a set of factors.

15. The computer usable program product of claim 10, further comprising:

program instructions to adjust, based on a response of the prospective customer to the offer, the offer.

16. The computer usable program product of claim 10, further comprising:

program instructions to adjust, based on an analysis of a social media communication of the prospective customer in response to the offer, the offer.

17. The computer usable program product of claim 10, further comprising:

program instructions to adjust, for the prospective customer using the travel time prediction model, the expected customer travel time; and program instructions to modify, using the optimal item exhaustion rate and the adjusted expected customer travel time, the offer time.

18. The computer usable program product of claim 10, wherein the stored program instructions are stored in the at least one of the one or more storage devices of a local data processing system, and wherein the stored program instructions are transferred over a network from a remote data processing system.

19. The computer usable program product of claim 10, wherein the stored program instructions are stored in the at least one of the one or more storage devices of a server data processing system, and wherein the stored program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure an offer, the offer specifying a physical product for sale, a physical location where the physical product can be bought, a time limit, and an upper limit of instances of the physical product;

program instructions to determine, from the time limit and the upper limit, an optimal item exhaustion rate corresponding to the offer, the optimal item exhaustion rate comprising a rate at which the physical product is desired to be sold in response to the offer, the optimal item exhaustion rate evenly distributing customer visits to the physical location throughout a time range corresponding to the offer;

program instructions to forecast, for a registered customer in a set of registered customers using a conversion prediction model executed using a processor and a memory, an expected conversion rate corresponding to the offer;

program instructions to forecast, for the registered customer using a travel time prediction model executed using the processor and the memory, an expected customer travel time corresponding to the offer;

program instructions to compute, using the processor and the memory, using the optimal item exhaustion rate, an expected customer interest level, and the expected customer travel time, the registered customer as a prospective customer;

program instructions to select, using the optimal item exhaustion rate and the expected customer travel time, an offer time corresponding to the prospective customer and the offer, the offer time selected to allow the prospective customer to arrive at the physical location at a time consistent with the optimal item exhaustion rate, the time being before the time limit and before a number of sold instances of the physical product exceeds the upper limit; and program instructions to transmit, at the offer time to a device associated with the prospective customer, the offer.

* * * * *